(12) United States Patent
Eaton

(10) Patent No.: US 10,713,416 B2
(45) Date of Patent: Jul. 14, 2020

(54) SYSTEMS, DEVICES AND METHODS FOR FONT SIZE SELECTION

(71) Applicant: EchoStar Ukraine, L.L.C., Kharkov (UA)

(72) Inventor: Zane Eaton, Plymouth, WI (US)

(73) Assignee: ECHOSTAR UKRAINE, L.L.C., Kharkov (UA)

(*) Notice: Subject to any disclaimer, the term of this patent is extended or adjusted under 35 U.S.C. 154(b) by 302 days.

(21) Appl. No.: 15/026,113

(22) PCT Filed: Sep. 30, 2013

(86) PCT No.: PCT/UA2013/000115
§ 371 (c)(1),
(2) Date: Mar. 30, 2016

(87) PCT Pub. No.: WO2015/047205
PCT Pub. Date: Apr. 2, 2015

(65) Prior Publication Data
US 2016/0246762 A1 Aug. 25, 2016

(51) Int. Cl.
*G06F 3/048* (2013.01)
*G06F 40/109* (2020.01)
(Continued)

(52) U.S. Cl.
CPC ........ *G06F 40/109* (2020.01); *G06F 3/04842* (2013.01); *G06F 3/04847* (2013.01);
(Continued)

(58) Field of Classification Search
CPC . G06F 17/214; G06F 3/04842; G06F 3/04847
See application file for complete search history.

(56) References Cited

U.S. PATENT DOCUMENTS 5,212,477 A * 5/1993 Indekeu .................. G06F 3/147
340/7.55
5,671,011 A * 9/1997 Kim ....................... H04N 17/04
348/189

(Continued)

OTHER PUBLICATIONS

International Search Report and Written Opinion dated Jun. 11, 2014, for corresponding PCT/UA Application No. 2013/000115, 10 pages.

*Primary Examiner* — Scott T Baderman
*Assistant Examiner* — Mario M Velez-Lopez
(74) *Attorney, Agent, or Firm* — Seed IP Law Group LLP

(57) ABSTRACT

Upon a user first installing, first launching, or otherwise first using a software application, a visual test may be provided that determines a desirable font size (i.e., size of text) to use throughout some or all user interfaces of that application or applicable device for that user. Based on prompts to the user regarding readability of the sample text of different font sizes and the responses received from the user, the system for font size selection may then select a default font size specifically for that user. The user's computing device may be in communication with a remote device or other server that that stores the selected fonts in a corresponding user profile, and then applies a corresponding font size selection to other connected devices of the user depending of the type of device and other user selectable options.

22 Claims, 12 Drawing Sheets

(51) Int. Cl.
*G09G 5/30* (2006.01)
*G06F 3/0484* (2013.01)
*G09B 21/00* (2006.01)

(52) U.S. Cl.
CPC ............ *G09G 5/30* (2013.01); *G09B 21/008* (2013.01); *G09G 2340/045* (2013.01); *G09G 2354/00* (2013.01)

(56) References Cited

U.S. PATENT DOCUMENTS

| | | | |
|---|---|---|---|
| 7,676,473 B2* | 3/2010 | Alperin | H04L 41/0806 |
| | | | 707/999.01 |
| 7,865,837 B1* | 1/2011 | Huff | G06F 9/451 |
| | | | 715/781 |
| 9,241,620 B1* | 1/2016 | Kockan | A61B 3/0033 |
| 10,033,737 B2* | 7/2018 | Sheinfeld | H04L 63/10 |
| 10,168,854 B2* | 1/2019 | Kockan | A61B 3/0025 |
| 10,321,818 B2* | 6/2019 | Singer | A61B 5/16 |
| 10,413,172 B2* | 9/2019 | Jensen | G06T 7/70 |
| 2002/0062325 A1* | 5/2002 | Berger | H04L 29/06 |
| | | | 715/229 |
| 2002/0124026 A1 | 9/2002 | Weber | |
| 2003/0093473 A1* | 5/2003 | Hara | G06F 16/9577 |
| | | | 709/203 |
| 2004/0253568 A1 | 12/2004 | Shaver-Troup | |
| 2006/0053096 A1* | 3/2006 | Subramanian | G06F 16/2428 |
| 2007/0130155 A1* | 6/2007 | Alperin | H04L 41/0889 |
| 2011/0157180 A1 | 6/2011 | Burger et al. | |
| 2012/0243735 A1 | 9/2012 | Wu | |
| 2012/0254779 A1* | 10/2012 | Ollivierre | A61B 3/0041 |
| | | | 715/764 |
| 2014/0313326 A1* | 10/2014 | Koushik | G09G 5/003 |
| | | | 348/143 |

* cited by examiner

SYSTEMS, DEVICES AND METHODS FOR FONT SIZE SELECTION

BACKGROUND

It often occurs that a user of a software application frequently has to manually adjust the font size of the text provided in various user interfaces of the application in order to comfortably read such text. This font size selection may have to be manually repeated for each application on the device, and perhaps each time the user launches the particular application. This wastes the time of the user, especially users that have vision impairments who must routinely manually adjust the font size of various applications in order to comfortably read the text presented in the application.

BRIEF SUMMARY

Upon a user first installing, first launching, or otherwise first using a software application, a visual test may be provided that determines a desirable font size to use throughout some or all user interfaces of that application or applicable device for that user. "Font" as used herein means style of text and "font size" means size of displayed text. For example, the font size selection system may display sample text of different font sizes to the user upon the user first installing or first launching an application. Based on prompts to the user regarding readability of the sample text of different font sizes and the responses received from the user, the system for font size selection may then select a default font size specifically for that user. The process may be implemented on the user's computing device locally or the user's computing device may be in communication with a remote device or other server that performs the operations to provide the test, selects the appropriate font size for the user and/or save the selected fonts in a corresponding user profile, and then applies or communicates a corresponding font size selection to the user's other connected devices. This may also occur depending of the type of connected device and other user selectable options.

The system for font size selection may provide support for multiple different users by saving the applicable font size selections in corresponding user profiles. Such a profile may be saved on a system remotely accessible by various computing devices of the user having various different user interfaces and display types. For example, these may include the user's mobile device, desktop computer, tablet device, the user's entertainment systems and devices and associated menus and guides, the user's vehicle dashboard display system, etc. "Mobile device" as used herein means any portable communications or computing device including cellular telephones, notebook computers, smartphones, personal digital assistants, tablet devices and the like. In this manner, with the various connected devices and systems of the user having remote access to the user's profile storing the selected font size(s), the user may complete the provided test one time on one of the devices and have the system for font size selection apply or communicate the corresponding fonts selected as a result of the test to all the various connected devices for the user, without the user having to repeat the test on each device. The test and resulting font size selection based on the test results may also be modified by the font size selection system according to requirements, standards or preferences regarding the corresponding application, devices, type of display, and/or application component.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION

Figure 1:
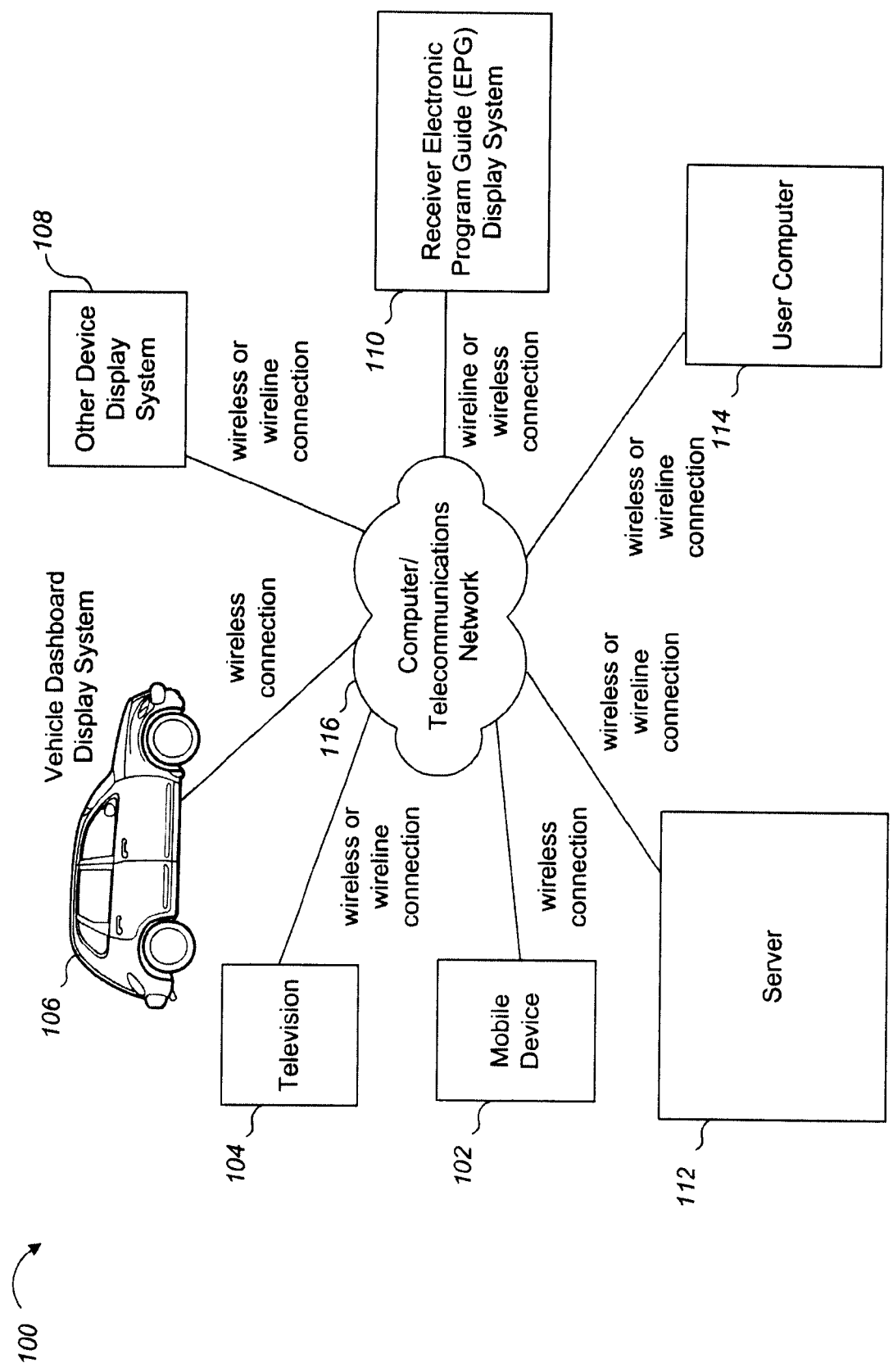
FIG. 1 is a system diagram of a networked environment, in which systems, devices and methods for font size selection may be a part, or in which they may be implemented, according to various illustrated embodiments.

In the following description, certain specific details are set forth in order to provide a thorough understanding of various disclosed embodiments. However, in light of this detailed description, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Various embodiments are described herein that provide systems, devices and methods for font size selection. For example, in one embodiment, upon a user first installing, first launching or otherwise first using an application, a visual test may be provided that determines a desirable font size to use throughout some or all user interfaces of that application for that user. For example, the computing device operating system, an application or system plug-in or add-on, or the application itself may display sample text of different font sizes to the user upon the user first installing or first launching an application after installation. Based on prompts to the user regarding readability of the sample text of different font sizes and the responses received from the user, the system for font size selection may then select a default font size for that user. The process may be implemented on the user's computing device locally or the user's computing device may be in communication with a remote device or other server that performs the operations to provide the test, select the appropriate font size for the user and or save the selected fonts in a corresponding user profile.

The system for font size selection may also provide the user options for and may also determine and select such options for the user regarding how the test should be provided, in which circumstances the test should be provided, on which applications, devices, types of displays, and/or application components the test should be provided and when. The system for font size selection may also provide the user options for and may also determine and select such options for the user regarding how frequently the test should be provided; the type of visual test to be used depending on the application and/or display of the device; font preferences based on different applications, devices, screen sizes and display types; how and for which applications, devices, types of displays, screen sizes and/or application components the test(s) should be modified. For example, this may be applicable to various different or different types of user interfaces, displays and screens.

The system for font size selection may provide support for multiple different users by saving the applicable font size selections in corresponding user profiles. Such a profile may be saved on a system remotely accessible by various computing devices of the user having various different user interfaces and display types. For example, these may include the user's mobile device (e.g., smartphone); desktop computer; tablet device; the user's entertainment systems and devices and associated menus and guides; the user's vehicle dashboard display system; etc. In this manner, with the various connected devices of the user having remote access to the user's profile storing the selected font size(s) and other user options and preferences, the user may complete the provided test one time on one of the devices and have the system for font size selection apply the corresponding fonts selected as a result of the test to all the various connected devices for the user without having to repeat the test on each device. The test and resulting font size selection selected according to the test results may also be modified by the font size selection system based on the corresponding application, devices, type of display or screen, screen size and/or application component.

FIG. 1 shows a networked environment 100, in which systems, devices and methods for font size selection may be a part, or in which they may be implemented, according to one illustrated embodiment.

For example, the networked environment 100 may include a mobile device 102, a receiver electronic program guide (EPG) display system 110, a television 104, a vehicle dashboard display system 106, a server 112 and a user computer 114 and one or more other device display systems. The one or more other device display systems are represented by other device display system 108. The receiver may include, for example, a satellite receiver, a cable set-top box and/or any radio receiver. The mobile device 102, the television 104, the receiver EPG display system 110, the vehicle dashboard display system 106, the server 112, the user computer 114 and the other device display system 108 are all communicatively coupled via a network 116 according to various illustrated embodiments. The network 116 may be any telecommunications network, computer network or combination of telecommunications and computer networks that enables communication between the various devices connected to the network 116 shown in FIG. 1. For example, mobile telecommunications provided by network 116 may include various analog and/or digital mobile telecommunications, for example, including those according to the long-term evolution (LTE), or "4G LTE", standard for wireless communication of high-speed data for mobile phones and data terminals based on the Global System for Mobile Communications (GSM)/Enhanced Data rates for GSM Evolution (EDGE) and Universal Mobile Telecommunications System (UMTS)/High Speed Packet Access (HSPA) network technologies, and/or other network technologies fulfilling specifications by the International Telecommunication Union.

The mobile device 102 can take the form of any of a large variety of mobile communications and/or processing devices having a handheld form factor. Examples of such may include cellular phones, personal digital assistants or PDAs (e.g., Blackberry® devices, iPhone® devices, Palm Pre® devices, Android® devices), cellular enabled laptop computers, netbook computers and tablet devices (e.g., iPad® device). Also, various embodiments may have additional, fewer or different mobile devices, display systems, servers, other devices and clients, etc., than that shown in FIG. 1. These may include switches, routers, communications equipment and/or service providers that are not shown in FIG. 1 (which may be included in the networked environment or as part of the network 116) but are not illustrated for clarity of presentation.

The mobile device 102, the television 104, the receiver EPG display system 110, the vehicle dashboard display system 106, the server 112, the user computer 114 and the other device display system 108 may be additionally or optionally linked by one or more other communication links or networks that comprise network 116. For example, a communications network of network 116 may include a local area network that uses wireless fidelity (Wi-Fi) high frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in FIG. 1. Thus, the mobile device 102, the television 104, the receiver EPG display system 110, the vehicle dashboard display system 106, the server 112, the user computer 114 and the other device display system 108 may have various applicable wireless transmitters and receivers and, in the case of using a Wi-Fi wireless link, may also have the corresponding executable Wi-Fi compatible network communications software that initiates, controls, maintains or manages the wireless link between the mobile device 102, the television 104, the receiver EPG display system 110, the vehicle dashboard display system 106, the server 112, the user computer 114 and the other device display system 108, and the various other devices and systems within or connected to network 116 over the Wi-Fi, satellite and/or cellular signal of the network 116.

The network 116 may comprise connections to computing systems such as those in the mobile device 102, the television 104, the receiver EPG display system 110, the vehicle dashboard display system 106, the user computer 114, the other device display system 108 and the server 112. Such computing systems provide font size selection services to the mobile device 102, the television 104, the receiver EPG display system 110, the vehicle dashboard display system 106, the user computer 114 and the other device display system 108. The network 116 may itself represent multiple interconnected networks. For instance, wired and wireless enterprise-wide computer networks, intranets, extranets, and/or the Internet may be included in or comprise a part of network 116. Embodiments may include various types of communication networks including other telecommunications networks, cellular networks, paging networks, and other mobile networks. There may be any variety of computers, switching devices, routers, bridges, firewalls, edge devices, multiplexers, phone lines, cables, telecommunications equipment and other devices within network 116 and/or in the communications paths between the mobile device 102, the television 104, the receiver EPG display system 110, the vehicle dashboard display system 106, the server 112, the user computer 114 and the other device display system 108. Some or all of such equipment of network 116 may be owned, leased or controlled by various service providers.

In accordance with an aspect of the disclosure, the mobile device 102, the television 104, the receiver EPG display system 110, the vehicle dashboard display system 106, the server 112, the user computer 114 and the other device display system 108 may contain discrete functional program modules that might make use of an application programming interface (API), or other object, software, firmware and/or hardware, to request services of one or more of the other entities within or connected to the network 116, such as the mobile device 102, the television 104, the receiver EPG display system 110, the vehicle dashboard display system 106, the server 112, the user computer 114 and the other device display system 108, or to request services of existing font size selection mechanisms of the operating system and/or applications residing on such devices.

For example, communication can be provided over a communications medium, e.g., client and server systems running on any one of the mobile device 102, television 104, vehicle dashboard display system 106, other device display system, receiver EPG display system 110, server 112 and user computer 114. These client and server systems may be coupled to one another via transmission control protocol/internet protocol (TCP/IP) connection(s) for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server, such as server 112. In the example of FIG. 1, the mobile device 102, the television 104, the receiver EPG display system 110, the vehicle dashboard display system 106, the user computer 114 and the other device display system 108 may be clients requesting the font size selection services of the server 112. However, any entity or subcomponent or subsystem thereof in FIG. 1, including the mobile device 102, the television 104, the receiver EPG display system 110, the vehicle dashboard display system 106, the server 112, the user computer 114 and/or the other device display system 108, can be considered a client, a server, or both, depending on the circumstances.

One or more cellular towers and stations may be part of a cellular network that is part of the network 116 and may be communicatively linked by one or more communications networks or communication mediums within the network 116. For example, network 116 may use a cellular or other wired or wireless signal in order to facilitate sending and receiving information in the form of synchronous or asynchronous voice communications, video, textual and/or encoded data to and from mobile device 102 and/or other objects shown in FIG. 1. This communication may be over a wireless signal on the cellular network of network 116 using applicable combinations and layers of telecommunications and networking protocols and standards such as 3G, HTTP and TCP/IP, etc., and may include information regarding font size selection and user profiles and preferences regarding font size selection.

Although the physical environment of the network 116 may have connected devices such as computers and mobile cellular devices, the physical environment may alternatively or additionally have or be described as comprising various digital devices such as personal digital assistants (PDAs), televisions, MP3 players, etc., software objects such as interfaces, Component Object Model (COM) objects and the like. Also, in various embodiments, the font size selection system may be downloaded via the network 116, be pre-installed or reside on one or more the devices locally and communicate with various underlying systems, operating systems, and/or APIs and/or software interfaces of other applications residing on the device locally. Such communication with various underlying systems, operating systems, APIs and/or other software interfaces of other applications residing on the device may be to obtain and display text of various fonts of the corresponding device and/or application; provide prompts via the user interface of the corresponding device and/or application; receive input in response to the prompts via the user interface of the corresponding device and/or application; and/or change font size selection of the corresponding device and/or some or all the various applications or operating systems installed on, currently running on, or providing services to the corresponding device.

There are a variety of systems, components, and network configurations that may also support distributed computing environments within the network 116. For example, computing systems may be connected together within the network 116 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the network 116.

Components of the network 116 that support, provide and/or facilitate communications devices on the network 116 may include those of a service provider. The service provider may be a cellular telephone service provider, receiver EPG display system service provider, Internet service provider, Wi-Fi access service provider, cable service provider, satellite service provider, other data service provider, or a service provider providing any combination of such services, etc. Generally, the service provider charges subscribers for use of the services provided. In the example provided herein, any one or more of mobile device 102, the television 104, the receiver EPG display system 110, the vehicle dashboard display system 106, the server 112, the user computer 114 and the other device display system 108 may use or include devices belonging to or used by users or entities who subscribe directly or indirectly to services provided by a service provider. Such services provided by a service provider may include those services and functionality of the font size selection system and may include those services and functionality provided by server 112, which may implement at least some of the services and functionality of the font size selection system. Also, the functions performed by the mobile device 102, the television 104, the receiver EPG display system 110, the vehicle dashboard display system 106, the server 112, the user computer 114 and the other device display system 108 may be performed by one or more systems connected to network 116 that individually perform and/or combine the functionalities of those systems and devices described above.

The embodiments and applicable system components will be described in the general context of computer-executable instructions, such as program application modules, objects, or macros stored on computer- or processor-readable storage media and executed by a computer or processor. In light of the detailed description herein, those skilled in the relevant art will appreciate that the illustrated embodiments as well as other embodiments can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network such as network 116. In a distributed computing environment, program modules may be located in both local and/or remote memory storage devices.

Overall, the font size selection system may provide a visual test on any one of mobile device 102, the television 104, the receiver EPG display system 110, the vehicle dashboard display system 106, the server 112, the user computer 114 and the other device display system 108 that determines and selects a desirable font size to use throughout some or all user interfaces of the corresponding device and/or application for that user. For example, the computing device operating system, an application or system plug-in or add-on for mobile device 102, or the application itself running on mobile device 102 may display sample text of different font sizes to the user upon the user first installing, first launching or otherwise first using an application on mobile device 102.

Based on prompts to the user regarding readability of the sample text of different font sizes and the responses received from the user, the system for font size selection may then select a default font size for that user. The process may be implemented on the mobile device 102 locally or the mobile device 102 may be in communication with a remote device such as server 112, or another server that performs the operations to communicate the test to the mobile device 102, select the appropriate font size for the user and/or save the selected fonts in a corresponding user profile accessible by the mobile device 102. The font size selection system may perform similar applicable corresponding operations on the various other devices of the user, including, for example, the television 104, the receiver EPG display system 110, the vehicle dashboard display system 106, the server 112, the user computer 114 and the other device display system 108.

The system for font size selection may also provide the user selectable options and preferences and may also determine and/or select such options and preferences for the user regarding how the test should be provided; in which circumstances the test should be provided; on which applications, devices, types of displays, screens and/or application components the test should be provided; and the resulting font size selection that should be applied at various times and circumstances. For example, the user may select to have the test performed only on their mobile device 102 and have the font size selection system component residing on server 112 access their user profile to store such font size selections to select appropriate fonts for their other connected devices shown in FIG. 1. This may be based on the test results and the display and/or screen type; screen size; and/or type of applications on the particular device. As another example, the user may select to have the test provided periodically based on weeks, months, years, etc., since the test was last performed, since the user's last eye exam, etc.

The user may also have the option to override the font selected by the font size selection system at any time. An example option is that the user selects the same font size for all devices, regardless of display size or type of the device, or may select to have the font size selected by the font size selection system for one application always be larger or smaller as compared to the default font size selected by the font size selection system for another application, such as by a percentage difference or a selected font pt. size difference. This may be useful for applications which involve a large amount of reading versus others that do not. For example, electronic book (e-book) applications require a large amount of reading and many video games may require much less reading. Other devices may require a large amount of scrolling to view a text of a large selected font size due to the menu layout, window layout and/or the display or screen size of the device. Thus, the user may choose an option to have the font size selection system not apply the larger font size selected by the system to such applications or particular devices, or to have the font size selection system determine and select a smaller font size in such circumstances. The user may also provide their reading glasses prescription as input to the font size selection system as a supplement to or instead of the visual test so that the font size selection system can select the font size based on the user's current reading glasses prescription. In this instance the system of the user's optometrist or other eye care specialist may be linked to the font size selection system via network 116 such that the prescription may be electronically communicated to the font size selection system, avoiding the user having to input the prescription. Such information regarding these and other user options and preferences may also be stored by the font size selection system in the user's profile.

The font size selection system may provide support for multiple different users by saving the applicable font size selections and other user options and preferences regarding font size selection in corresponding user profiles. Such a profile may be saved on server 112 or another system remotely accessible via network 116 by various computing devices of the user having various different user interfaces and display types, such as mobile device 102, the television 104, the receiver EPG display system 110, the vehicle dashboard display system 106, the user computer 114 and the other device display system 108. In this manner, with the mobile device 102, the television 104, the receiver EPG display system 110, the vehicle dashboard display system 106, the user computer 114 and the other device display system 108 having remote access to the user's profile storing the selected font size(s), the user may complete the provided test one time on one of the devices such as, for example, mobile device 102, and the system for font size selection will apply the corresponding fonts selected as a result of the test to all the various connected devices for the user without the user having to repeat the test on each device.

Also, the test and resulting font size selection based on the test results may be modified by the font size selection system based on the corresponding application; devices; type of display or screen; application and/or system components of the television 104, the receiver EPG display system 110, the vehicle dashboard display system 106, the user computer 114 and the other device display system 108. In particular, such information regarding the applicable selected font size may be communicated from server 112 to the corresponding application, user interface, menu systems, APIs and/or application components of the television 104, the receiver EPG display system 110, the vehicle dashboard display system 106, the user computer 114 and the other device display system 108 to effect the corresponding font setting on the particular device.

The system for font size selection may also provide the user selectable preferences and options and may also determine and/or select such options for the user regarding how frequently the test should be provided; the type of visual test to be used depending on the application, screen and/or display of the device; font preferences based on different applications, device and display types; and for which applications, devices, types of displays, and/or application components the test(s) should be modified. These selectable preferences and options may be for one or more of the various different or different types of user interfaces, display types, screen types, menus systems, applications, etc., of mobile device 102, the television 104, the receiver EPG display system 110, the vehicle dashboard display system 106, the user computer 114 and the other device display system 108.

Figure 2:
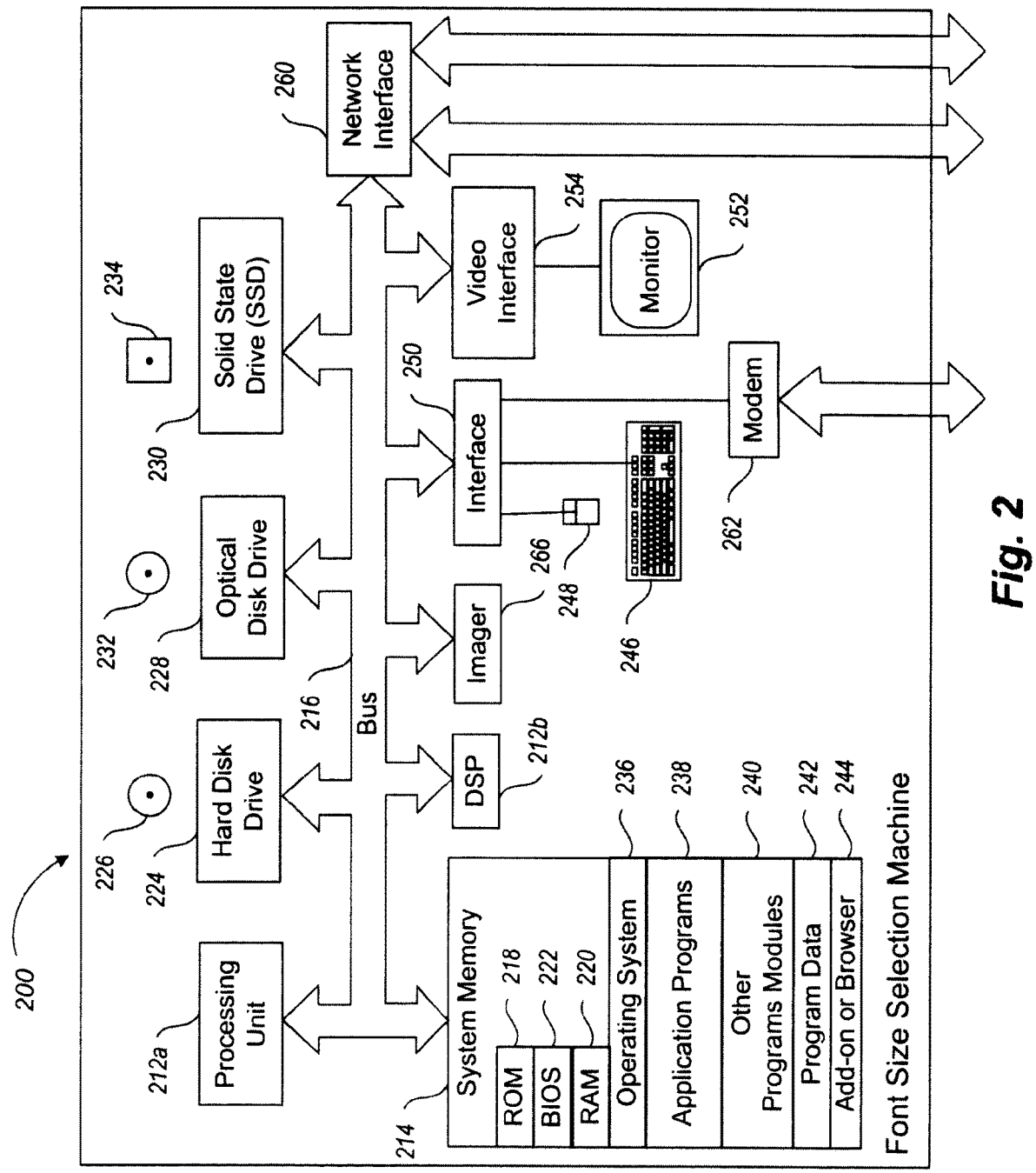
FIG. 2 is a schematic diagram of an example font size selection machine, suitable for implementing systems, devices and methods for font size selection such as those shown in FIGS. 1 and 2-12, according to various illustrated embodiments.

FIG. 2 is a schematic diagram of an example font size selection machine 200, suitable for implementing systems, devices and methods for font size selection such as those shown in FIGS. 1 and 2-12. The font size selection machine 200 is suitable for implementing systems, devices and methods for font size selection, according to various illustrated embodiments. Some or all of the same, similar or equivalent structure and functionality of the font size selection machine 200 shown in FIG. 2 and described herein may be that of, part of or operably connected to, mobile device 102, the television 104, the receiver EPG display system 110, the vehicle dashboard display system 106, the server 112, the user computer 114, the other device display system 108 of FIG. 1 and/or the overall font size selection system as described herein. The font size selection machine 200 will at times be referred to in the singular herein, but this is not intended to limit the embodiments to a single device since in typical embodiments, there may be more than one computer system or devices involved in the font size selection machine 200. Unless described otherwise, the construction and operation of the various blocks shown in FIG. 2 are of conventional design. As a result, such blocks need not be described in further detail herein, as they will be understood by those skilled in the relevant art in light of this detailed description.

The font size selection machine 200 may include one or more processing units 212a, 212b (collectively 212), an imager 266 for recording images on which optical character recognition and then font size selection may be performed, a system memory 214 and a system bus 216 that couples various system components including the system memory 214 to the processing units 212. The processing units 212 may be any logic processing unit, such as one or more central processing units (CPUs) 212a, digital signal processors (DSP) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the font size selection machine 200, such as during start-up.

The font size selection machine 200 may also include a plurality of interfaces such as network interface 260, interface 250 supporting modem 262 or any other wireless/wired interfaces.

The font size selection machine 200 may include a hard disk drive 224 for reading from and writing to a hard disk 226, an optical disk drive 228 for reading from and writing to removable optical disks 232, and/or a solid state drive (SSD) 230 for reading from and writing to one or more non-removable or removable solid state memory devices 234 which include integrated circuit assemblies as memory to store data persistently. The optical disk 232 can be a DVD-RW, while the solid state memory device 234 may be a flash memory device, for example. The hard disk drive 224, optical disk drive 228 and SSD 230 may communicate with the processing unit 212 via the system bus 216. The hard disk drive 224, optical disk drive 228 and SSD 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the font size selection machine 200. Although the depicted font size selection machine 200 is illustrated employing a hard disk 224, optical disk 228 and SSD 230, in light of this detailed description, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, digital versatile disks (DVD) or other optical disk storage, magnetic cassettes, magnetic tape or other magnetic storage devices, SSD, solid state memory or any other medium which can be used to store the desired information and which may be accessed by processing unit 212*a*.

Program modules can be stored in the system memory 214, such as an operating system 236, one or more application programs 238, other program modules 240 and program data 242. The application programs 238 and other program modules 240 may include, but are not limited to, mobile device applications, software components and modules, APIs, software application add-ons, widgets, and software application plug-ins. Application programs 238 may include instructions that cause the processor(s) 212 to perform font size selection for various devices and/or corresponding software applications of such devices, including, for example, mobile device 102, the television 104, the receiver EPG display system 110, the vehicle dashboard display system 106, the server 112, the user computer 114 and the other device display system 108 of FIG. 1. In particular the program modules 240 may include modules that correspond to and/or, working in conjunction with the various hardware components of the font size selection machine 200, implement the functions of one or more current font size selection components, user identification components, user authentication components, communications components, sample text display components, user prompt components, font comparison and selection components, device determination and font size selection components, process repeating components, user profile and font size selection storage components, database searching components, etc., of the server, the user computer 114 and/or other device(s) of the system for font size selection 100 of FIG. 1. For example, various program modules 240 may include instructions for handling security such as password or other access protection and communications encryption.

The system memory 214 may also include communications programs, for example, a Web client, mobile device application, software application add-on, widget, plug-in or browser 244 for implementing visually displaying the visual test, providing font size selection, and permitting the font size selection machine 200 to access and exchange data with sources such as Web sites of the Internet, corporate intranets, extranets, or other networks and devices as described herein, as well as other server applications on server computing systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, Apple, and Microsoft of Redmond, Wash.

While shown in FIG. 2 as being stored in the system memory 214, the operating system 236, application programs 238, other program modules 240, program data 242 and browser 244 can be stored on the hard disk 226 of the hard disk drive 224, the optical disk 232 of the optical disk drive 228 and/or the solid state memory device(s) 234 of the SSD 230.

An operator can enter commands and information into the font size selection machine 200 through input devices such as a touch screen or keyboard 246 and/or a pointing device such as a mouse 248, and/or via a graphical user interface. Other input devices can include a microphone, joystick, game pad, tablet, scanner, digital camera, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The font size selection machine 200 can include other output devices, such as speakers, printers, etc.

The font size selection machine 200 can operate in a networked environment using logical connections to one or more remote computers and/or devices as described above with reference to FIG. 1. For example, the font size selection machine 200 can operate in a networked environment using logical connections to one or more mobile devices, receiver EPG display systems, end user computers and service providers and/or information servers. Communications may be via a wired and/or wireless network architecture, for instance, wired and wireless enterprise-wide computer networks, intranets, extranets, telecommunications networks, cellular networks, paging networks, and other mobile networks.

Figure 3:
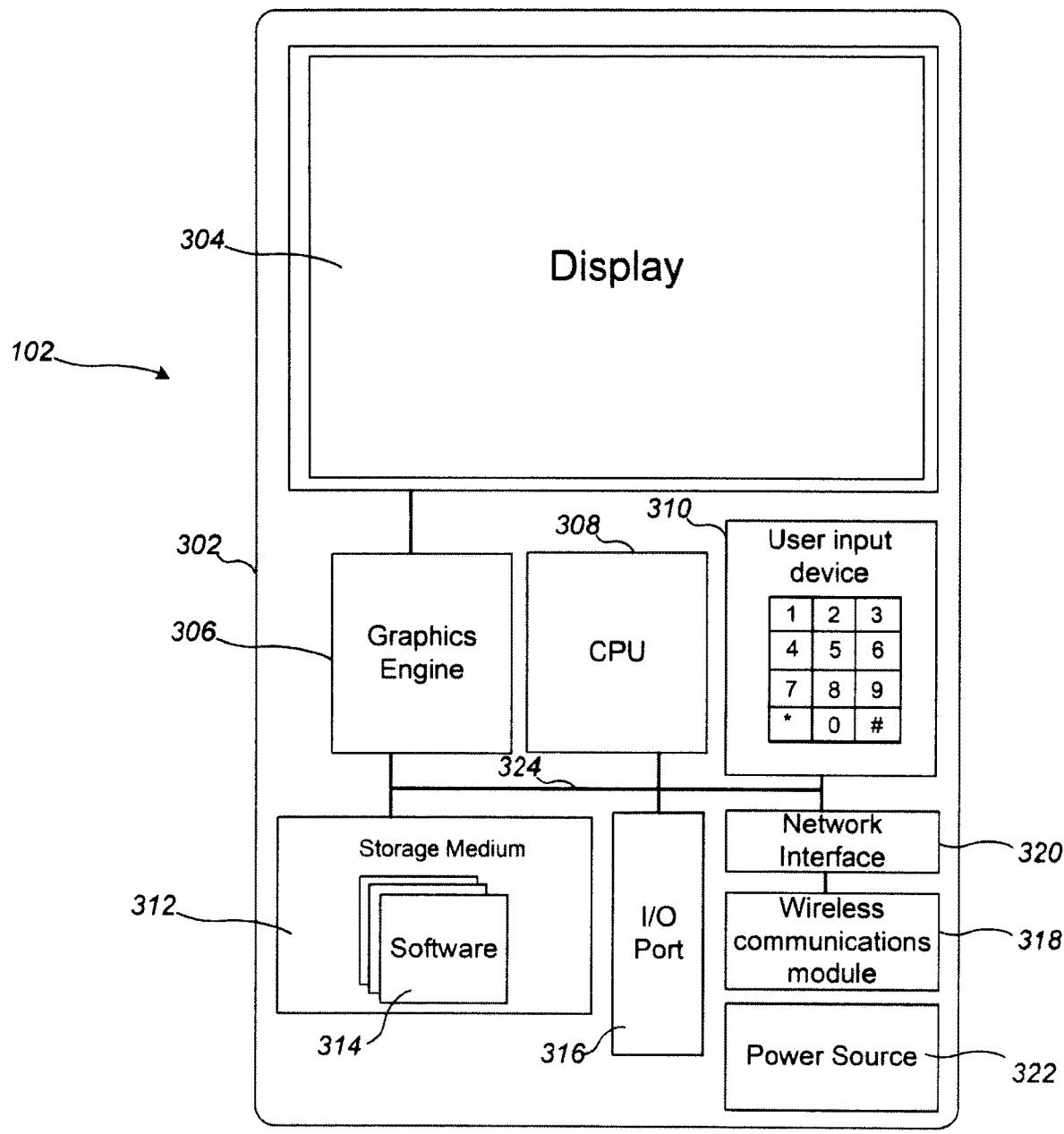
FIG. 3 is a schematic view of the mobile device of FIG. 1, shown in more detail, according to various illustrated embodiments.

FIG. 3 shows the mobile device 102 of FIG. 1 in more detail according to one example embodiment. The mobile device 102 may have a housing 302, a display 304, a graphics engine 306, a central processing unit (CPU) 238, user input device 310, storage medium 312 having various software modules 314 stored thereon comprising instructions that are executable by the CPU 308, an I/O port 316, a wireless communication module 318, a network interface 320, and a power source 322. I/O port 316 may include one or more different types if I/O ports for various different types of applicable connections. Wireless communication module 318 may include one or more wireless transmitters, receivers, and/or transceivers. Also, network interface 320 may include one or more different network interfaces for different types of communication networks. In some embodiments, some or all of the same, similar or equivalent structure and functionality of the mobile device 102 shown in FIG. 3 and described herein may be that of, part of or operably connected to a communication and/or computing system of vehicle dashboard display system 106 and/or other device display system.

As previously noted, the mobile device 102 may be any of a large variety of communications devices such as a cellular telephone, a smartphone, a portable media player (PMP), a personal digital assistant (PDA), a mobile communications device, a portable computer with built-in or add-on cellular communications, a portable game console, a global positioning system (GPS), a handheld industrial electronic device, or the like, or any combination thereof. The mobile device 102 has at least one central processing unit (CPU) 308 which may be a scalar processor, a digital signal processor (DSP), a reduced instruction set (RISC) processor, or any other suitable processor. The central processing unit (CPU) 308, display 304, graphics engine 306, user input device 310, storage medium 312, I/O port 316, wireless communications module 318, and network interface 320 may all be communicatively connected to each other via a system bus 324 and are configured to work in conjunction to execute instructions to perform the operations of the font size selection system described herein, including, but not limited to, generating, operating and displaying on the display 304 the example font size selection test and interfaces shown in FIGS. 4-9 and described herein and performing the processes shown in FIGS. 10-12 and described herein. The system bus 324 can employ any suitable bus structures or architectures, including a memory bus with memory controller, a peripheral bus, and/or a local bus.

The mobile device 102 also includes storage medium 312. Storage medium 312 may include one or more volatile and/or non-volatile storage mediums. The storage medium 312 may be comprised of any single or suitable combination of various types of processor-readable storage media and may store instructions and data acted on by CPU 308. For example, a particular collection of software instructions comprising software 314 and/or firmware instructions comprising firmware are executed by CPU 308. The software or firmware instructions generally control many of the operations of the mobile device 102 and a subset of the software and/or firmware instructions may perform functions to operatively configure hardware and other software in the mobile device 102 to provide the initiation, control and maintenance of applicable computer network and telecommunication links from the mobile device 102 to the television 104, the receiver EPG display system 110, the vehicle dashboard display system 106, the server 112, the user computer 114 and the other device display system 108 via the network 116 as shown in FIG. 1 using the wireless communications module 318, network interfaces 320, and/or I/O port 316.

By way of example, and not limitation, the storage medium 312 may be a processor-readable storage medium which may comprise any combination of computer storage media including volatile and nonvolatile, removable and non-removable media implemented in any method or technology for storage of information such as computer readable instructions, data structures, program modules or other data. Combinations of any of the above should also be included within the scope of processor-readable storage media.

The storage medium 312 may include system memory which includes computer storage media in the form of volatile and/or nonvolatile memory such as read-only memory (ROM) and random access memory (RAM). A basic input/output system (BIOS), containing the basic routines that help to transfer information between elements within mobile device 102, such as during start-up or power-on, is typically stored in ROM. RAM typically contains data and/or program modules that are immediately accessible to and/or presently being operated on by CPU 308. By way of example, and not limitation, FIG. 3 illustrates software modules 314 including an operating system, application programs and other program modules that implement the processes and methods described herein for font size selection.

The mobile device 102 may also include other removable/non-removable, volatile/nonvolatile computer storage media drives. By way of example only, the storage medium 312 may be a hard disk drive or solid state storage drive that reads from or writes to non-removable, nonvolatile media, an SSD that reads from or writes to a removable, nonvolatile SSD, and/or an optical disk drive that reads from or writes to a removable, nonvolatile optical disk such as a DVD-RW or other optical media. Other removable/non-removable, volatile/nonvolatile computer storage media that can be used in an operating environment of the mobile device 102 include, but are not limited to, flash memory cards, other types of digital versatile disks (DVDs), micro-discs, digital video tape, solid state RAM, solid state ROM, and the like. The storage medium(s) are typically connected to the system bus 324 through a non-removable memory interface. The storage medium 312 discussed above and illustrated in FIG. 3, provides storage of computer readable instructions, data structures, program modules and other data for the mobile device 102. In FIG. 3, for example, a storage medium may store software 314 including an operating system, application programs, other program modules, and program data. The storage medium 312 may implement a file system, a flat memory architecture, a database, or any other method or combination capable of storing such information.

A user may enter commands and information into the mobile device 102 through touch screen display 304 or the input device 310. The input device 310 may include, but is not limited to one or more of: a keypad, keyboard, camera, motion sensor, position sensor, light sensor, biometric data sensor, accelerometer, or a pointing device, commonly referred to as a mouse, trackball or touch pad, any of which may be used to authenticate the user. Other input devices of the mobile device 102 may include a microphone, joystick, thumbstick, game pad, optical scanner, other sensors, or the like. These and other input devices are often connected to the CPU 308 through a user input interface that is coupled to the system bus 324, but may be connected by other interface and bus structures, such as a parallel port, serial port, wireless port, game port or a universal serial bus (USB). Generally, a unique software driver stored in software 314 configures each input mechanism to sense user input, and then the software driver provides data points that are acted on by CPU 308 under the direction of other software 314. The display is also connected to the system bus 324 via an interface, such as the graphics engine 306. In addition to the display 304, the mobile device 102 may also include other peripheral output devices such as speakers, a printer, a projector, an external monitor, etc., which may be connected through I/O port 316, network interfaces 320 or wireless communications module 318.

The mobile device 102 may operate in a networked environment using connections to one or more remote computers or devices, such as a remote computer or device of the server 112, television 104, vehicle dashboard display system 106, other device display system, and/or user computer 114 within or connected to the computer network 116 of FIG. 1 and described above. The remote computer within or connected to network 116 may be a personal computer, a server, a router, a network PC, a peer device or other common network node, and typically includes many or all of the elements described above relative to the font size selection machine 200 of FIG. 2. Such connections to the network 116 may include connections over cellular, satellite, local area network (LAN) connections or wide area network (WAN) connections as described above, and/or other networks.

When used in a LAN or WAN networking environment, the mobile device 102 may be connected via the wireless communications module 318 and network interfaces 320, which may include, for example, one or more cellular receivers and transmitters, Wi-Fi receivers and transmitters, and associated network interfaces. When used in a WAN networking environment, the mobile device 102 may include a modem or other means as part of the network interfaces for establishing communications over the WAN, such as the Internet. The wireless communications module 318 and the network interface 320 may be communicatively connected to the system bus 324. In a networked environment, program modules depicted relative to the mobile device 102, or portions thereof, may be stored in a remote memory storage device of a remote system.

The mobile device 102 has I/O port 316, wireless communications module 318 and/or network interfaces 320 for passing data over short distances to and from the mobile device 102 or for coupling additional storage to the mobile device 102. For example, serial ports, USB ports, Wi-Fi ports, Bluetooth® ports, IEEE 1394 (i.e., FireWire), and the like can communicatively couple the mobile device 102 to other computing apparatuses. Compact Flash (CF) ports, Secure Digital (SD) ports, and the like can couple a memory device to the mobile device 102 for reading and writing by the CPU 308 or couple the mobile device 102 to other communications interfaces such as Wi-Fi or Bluetooth transmitters/receivers and/or network interfaces.

Mobile device 102 also has a power source 322 (e.g., a battery). The power source 322 may supply energy for all the components of the mobile device 102 that require power when a traditional, wired or wireless power source is unavailable or otherwise not connected. Other various suitable system architectures and designs of the mobile device 102 are contemplated and may be utilized which provide the same, similar or equivalent functionality as those described herein to implement font size selection.

It should be understood that the various techniques, components and modules described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as various solid state memory devices, DVD-RW, RAM, hard drives, flash drives, or any other machine-readable or processor-readable storage medium wherein, when the program code is loaded into and executed by a machine, such as a processor of a computer, vehicle or mobile device, the machine becomes an apparatus for practicing various embodiments. In the case of program code execution on programmable computers, vehicles or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system including the example font size selection machine 200 depicted in FIG. 2 and also in FIG. 3 of mobile device 102. However, the program(s) can be implemented in assembly or machine language, if desired. In any case, the language may be a compiled or interpreted language, and combined with hardware implementations.

Figure 4:
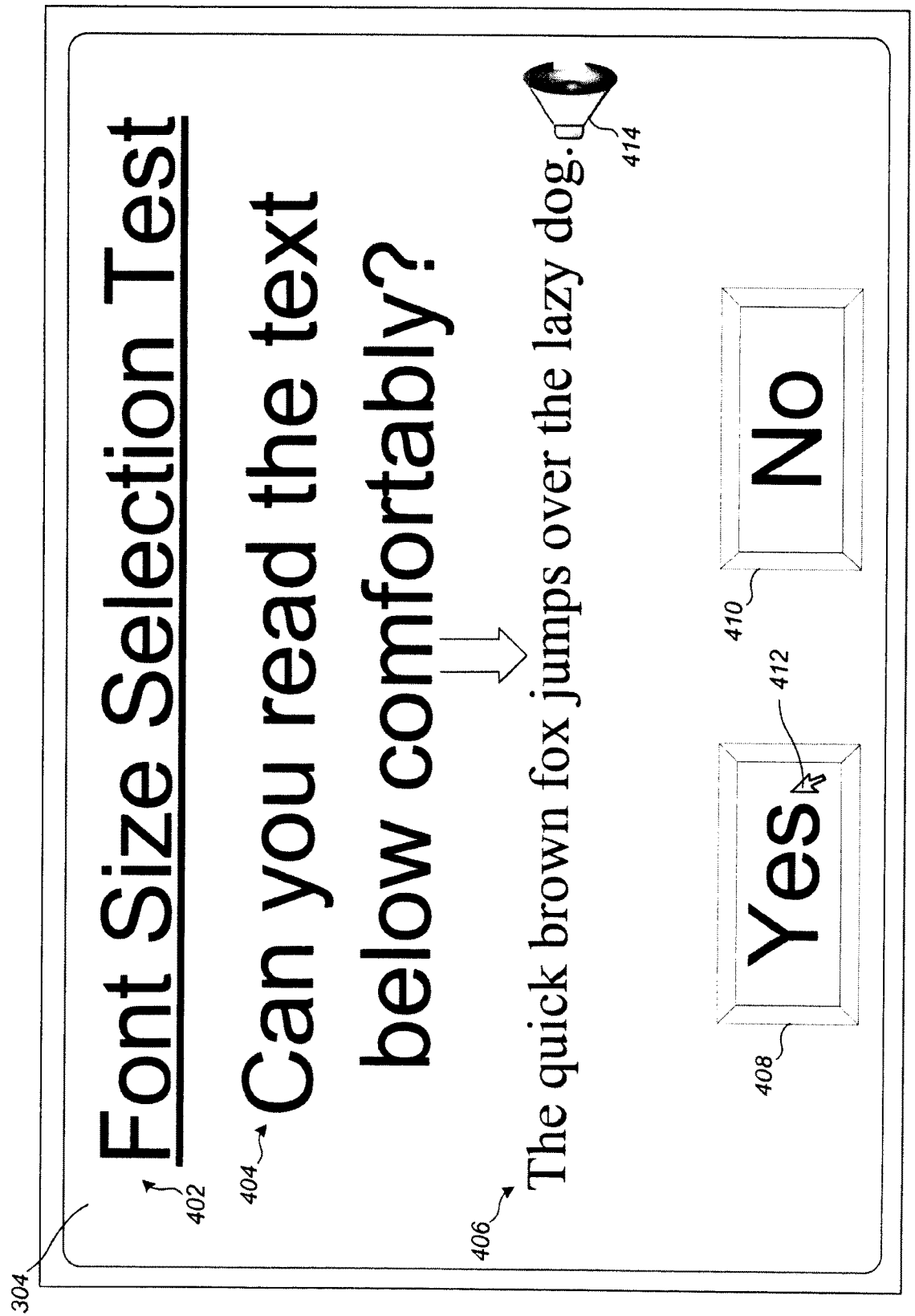
FIGS. 4-8 are images of the example display of the of the mobile device of FIGS. 1 and 3, showing example visual tests provided by the font size selection system, according to various illustrated embodiments.

FIGS. 4-8 are images of the example display of the mobile device of FIGS. 1 and 3, showing example visual tests provided by the font size selection system, according to various illustrated embodiments. As shown in FIG. 4, a visual font size selection test 402 is displayed on the example display 304 of mobile device 102 that facilitates the determination by the font size selection system of a desirable font size to use throughout some or all user interfaces of one or more applications on the mobile device 102 and/or on other devices for that user. These other devices of the user may include the television 104, the receiver EPG display system 110, the vehicle dashboard display system 106, the user computer 114 and/or the other device display system 108 shown in FIG. 1. The font size selection test 402 displayed on the example display 304 as shown in FIGS. 4-8 may also or instead be displayed on one or more of these other devices in various embodiments. In some embodiments, the visual test may be provided upon a user first installing, first launching or otherwise first using an application or service for which the font size selection will be made by the font size selection system.

In the example embodiment provided in FIGS. 4-8, the test starts by prompting the user using a relatively large font size for the prompt itself that most users, even most users with level vision impairment, would likely be able to read. The font size selection system does this by presenting an initial prompt 404 that asks the user whether the user can comfortably read some displayed sample text 406 of a particular relatively large font size that is likely able to be read by most people who have some level of vision impairment. In the example provided in FIG. 4, the sample text 406 in the visual test is displayed using a 28 pt. font size initially, but other font sizes may also be used as applicable.

Figure 5:
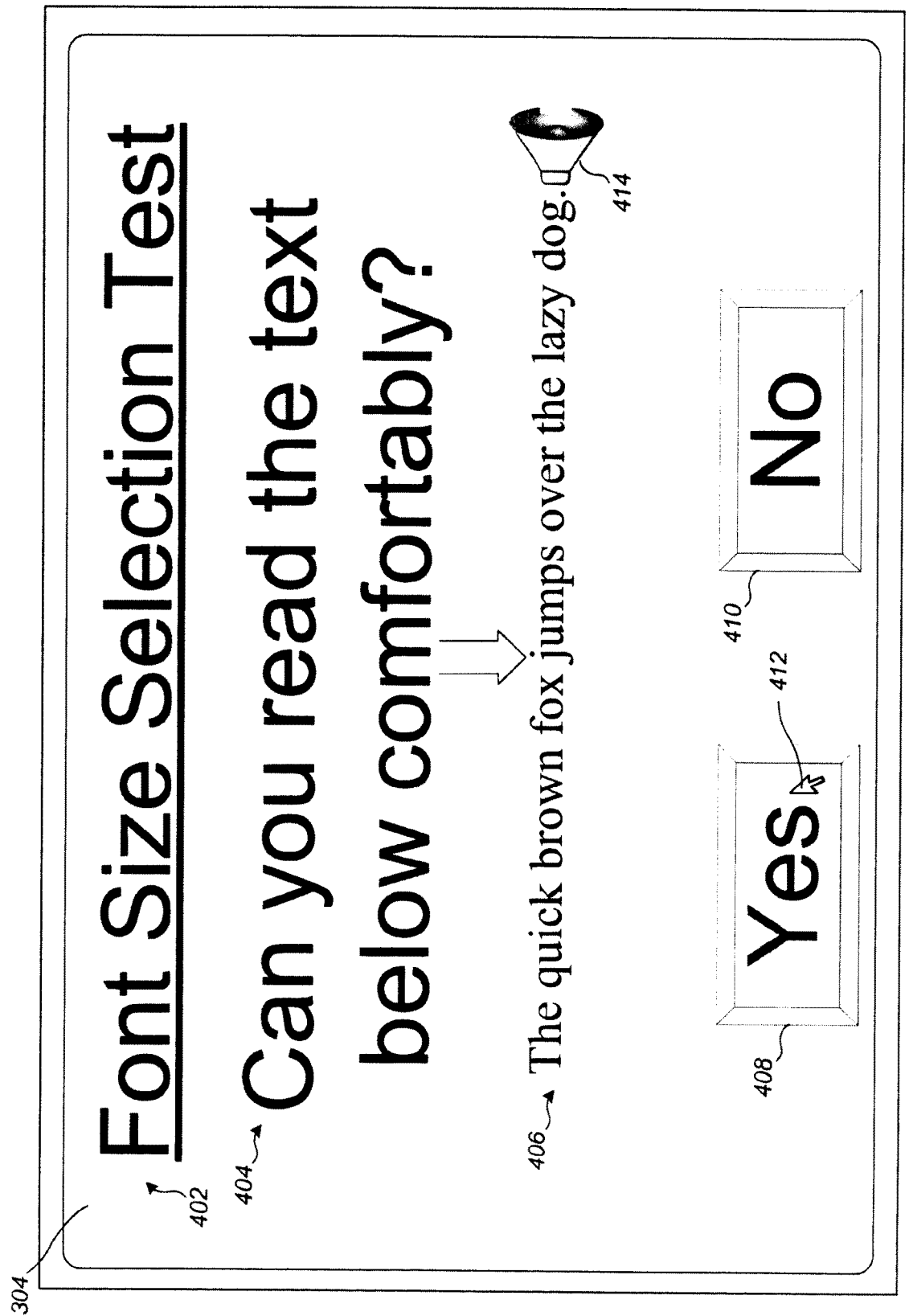
Figure 6:
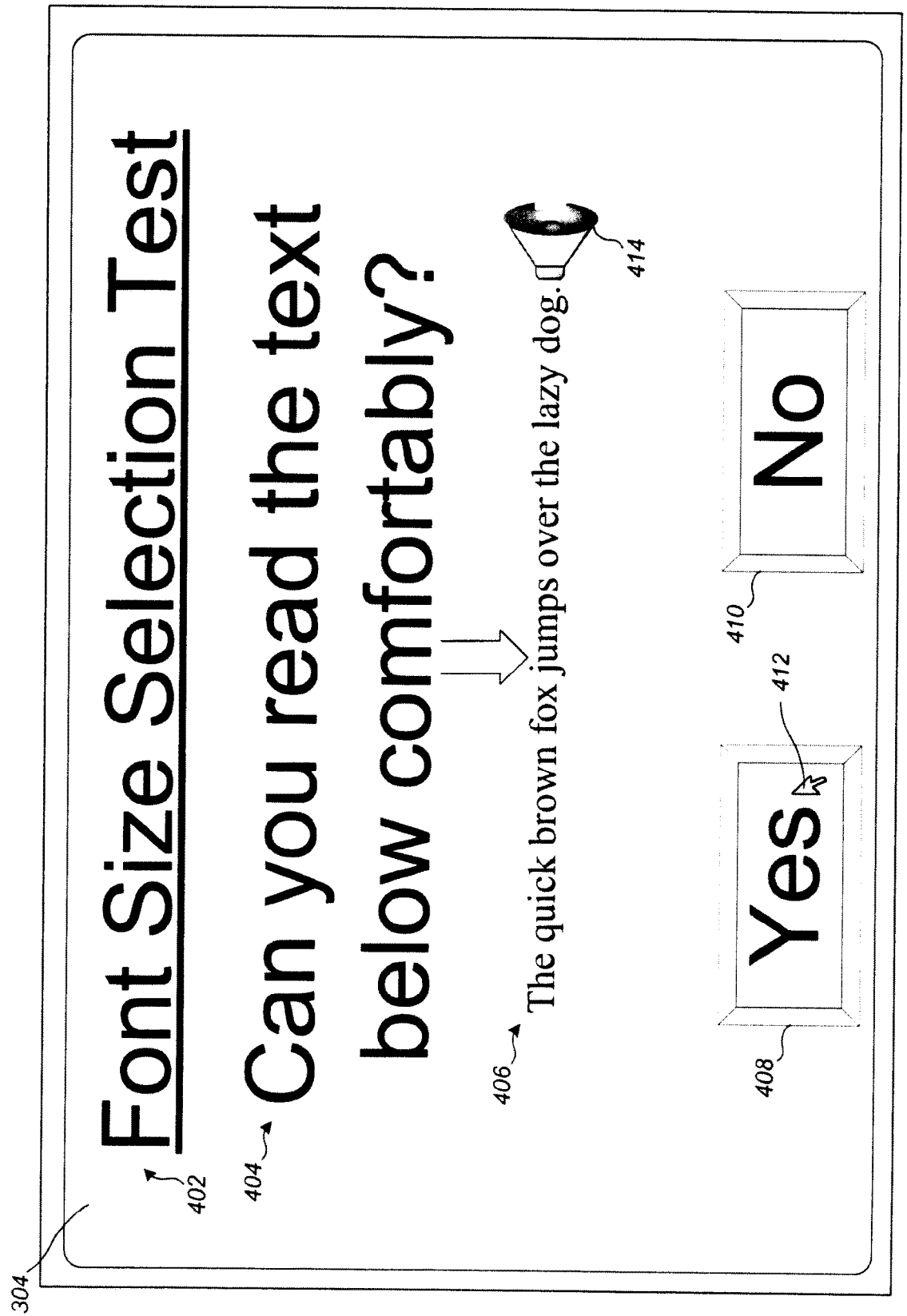
Figure 7:
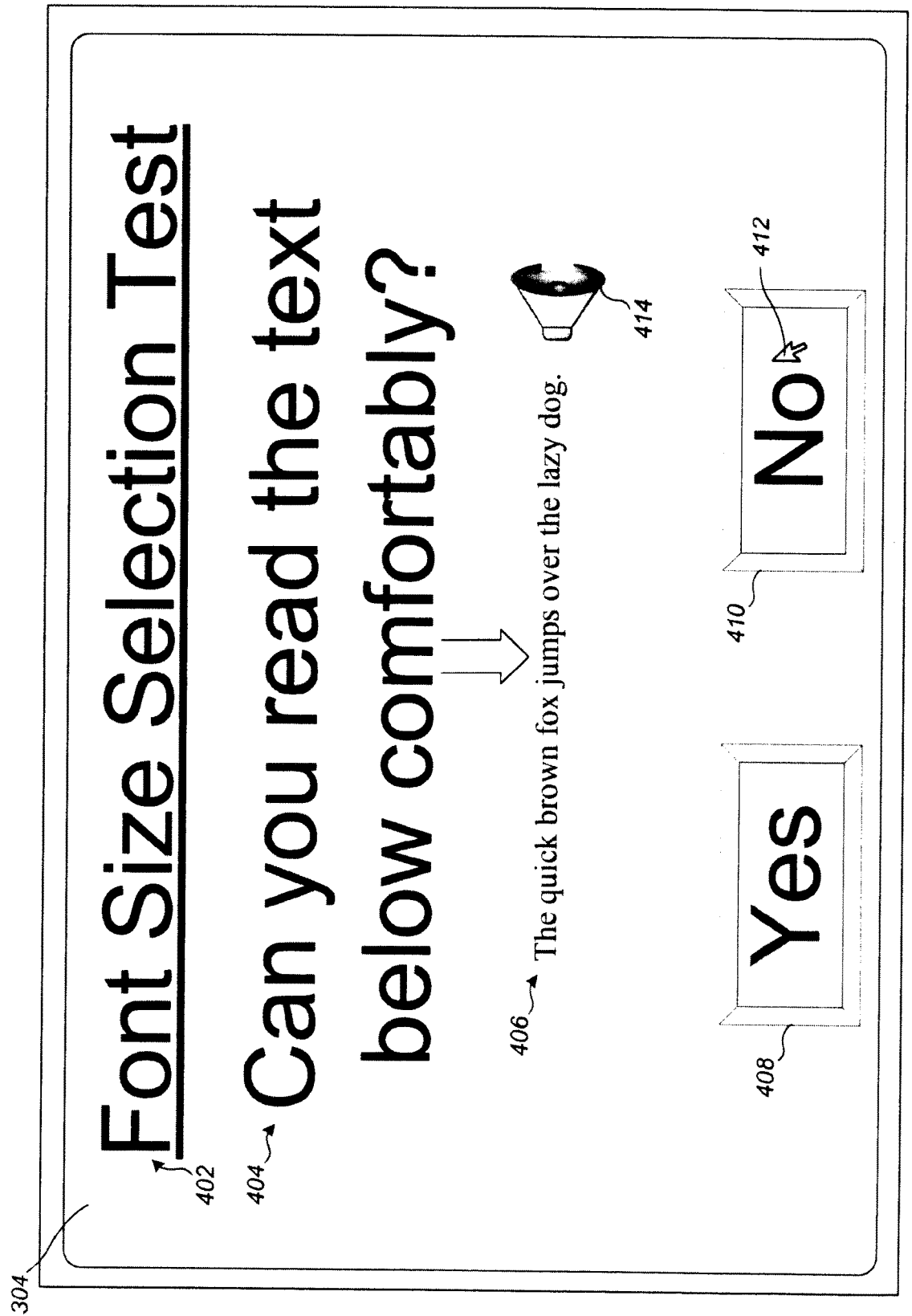

The user indicates his or her answer to the prompt as being "Yes" by providing applicable input such as by selecting the "Yes" button 408. In various embodiments, this may be performed by using a touchscreen of the mobile device 102, an input device to move a cursor 412, a voice command, a microphone of the mobile device 102 and/or other input device. The cursor 412 may include a pointer or any graphical user interface element moveable by a user to select an item shown on the display 304. The next page presented on the display 304 in the process of the test will submit the same prompt 404, but with the text sample 406 being displayed in a smaller font size than that which was shown with the previous prompt, for example, by moving down to use 24 pt. font size as shown in FIG. 5. This process of prompting the user regarding the readability of the sample text 406 displayed and then displaying the sample text 406 in a smaller font size if the user indicates that he or she can still comfortably read the sample text 406 in the smaller font size will continue until the user indicates he or she can no longer comfortably read the sample text 406 by indicating their answer to the prompt as being "No" by providing applicable input such as by selecting the "No" button 410 as shown in FIG. 7, for example. The font size selection system may then select the font size of the sample text 406 for which the user last indicated he or she could read comfortably (shown in FIG. 6) as the font size to use throughout some or all user interfaces of one or more applications on the mobile device 102 and/or on other devices for that user. In the present example, this selected font size is 20 pt. font size as shown in FIG. 6 because, in the present example, that is the font size of the sample text 406 that the user last indicated he or she could read comfortably. However, other users may select other sample text of other font sizes according to the readability of the sample text for that particular user.

The initial font size of the sample text 406 may be selected based on one more of a number of factors including, but not limited to: the range of available font sizes; the likelihood or probability that a person with various levels of vision impairment would be able to read text with the initial font size; a user's reading glasses prescription input to the font size selection system; application or device for or on which the test is being presented; display type; screen type; screen size options or preferences selected by the user, etc.

In some embodiments, some of the test may be provided in audio form. For example, the prompt 406 may also or instead be an audio prompt. Instructions may be provided in audio and/or text. The user may also select a user selectable audio icon 414, which, when selected, causes the sample text to be read aloud via a speaker of the mobile device 102 or other connected device so the user can hear the sample text to determine whether they read it correctly. Selection of such a selectable audio icon 414 may in some embodiments play the prompts of the test in audio and/or play other test instructions.

In alternative embodiments, the visual test may instead start with sample text of a small font size that the user is likely not able to read and then increase the font size until the user indicates that the user can read the sample text. Then the font size selection system may select the font size of the sample text first presented for which the user indicated he or she could read comfortably as the font size to use throughout some or all user interfaces of one or more applications on the mobile device 102 and/or on other devices for that user. Also, in some embodiments, additional or different tests may instead or also be provided by the font size selection system. The font size selected by the font size selection system to use throughout some or all user interfaces of one or more applications on the mobile device 102 and/or on other devices for that user may become the default font of that user, application and/or device, or in some embodiments may revert to the original font size at a certain time and in certain circumstances. This feature may be provided as a user selectable option or preference and may also be saved in the user profile. The font size selected by the font size selection system as a result of the test provided may also change on a per-user basis, based the font size selection system accessing the stored font size selection and user preferences and options stored in the current user's profile.

Figure 8:
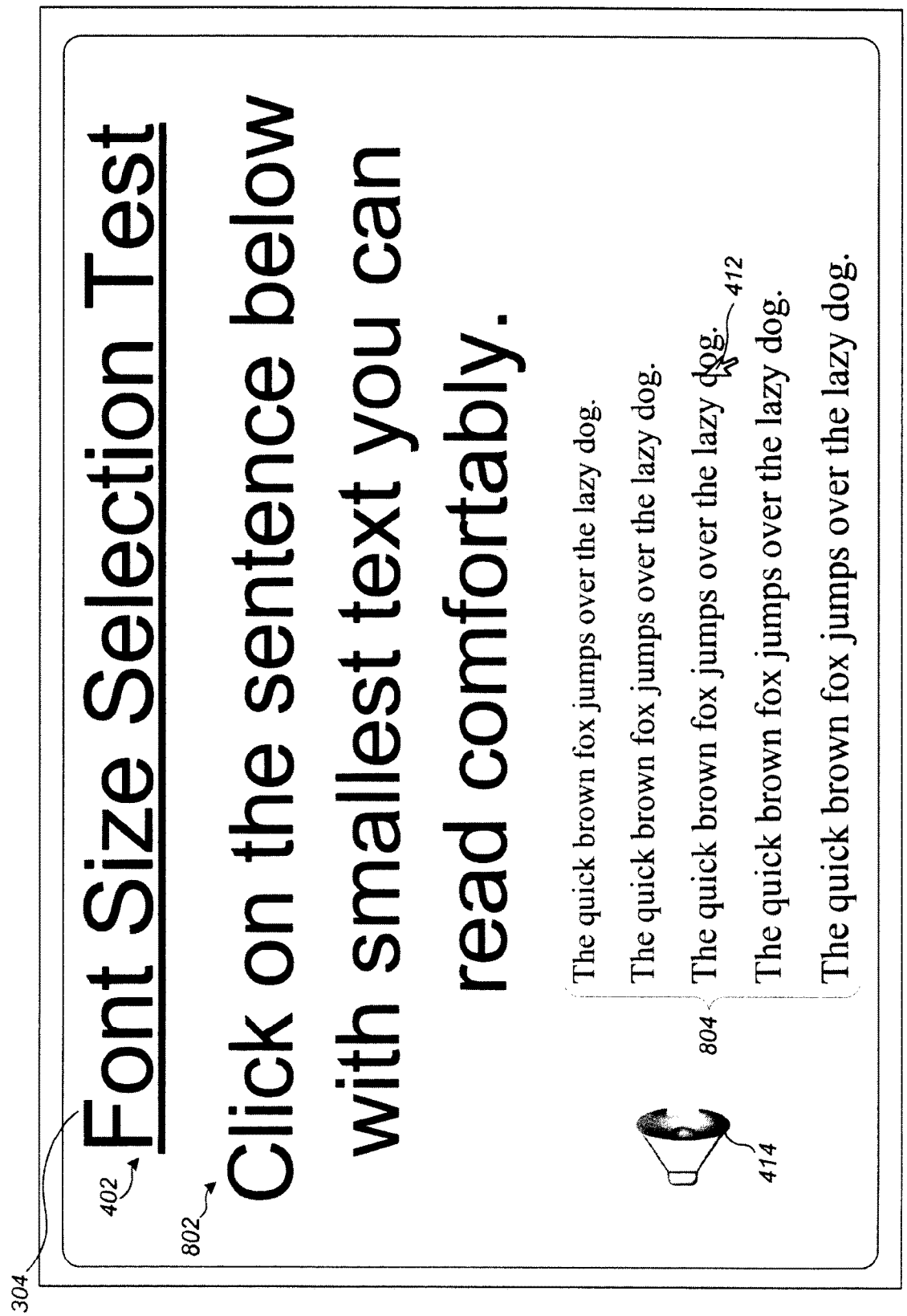

FIG. 8 is an image of the example display 304 of the mobile device 102 of FIGS. 1 and 3, showing an example addition or alternative to the font size selection test example shown in FIGS. 4-7. In one embodiment, the font size selection system may present a selection of samples of text shown in different font sizes to the user on display 304. A prompt 802 will then be presented on display 304 asking the user to select, including by clicking on or touching, the sample text of the smallest font size the user can read comfortably. This font size will then be selected by the font size selection system as the font size to use throughout some or all user interfaces of one or more applications on the mobile device 102 and/or on other devices for that user. If the user indicates he or she cannot read any of the sample text comfortably or indicates that the user can comfortably read the sample text of the smallest font size displayed, then additional sample text of different font sizes, either larger or smaller as applicable, may be presented and the prompt 802 will be presented again with the additional text samples of different font sizes.

In embodiments where the test shown in FIG. 8 is provided in addition to the test shown in FIGS. 4-7, the test shown in FIG. 8 can be presented as a follow-on test to more accurately determine the minimum font size that would be acceptable to the user than when providing the test shown in FIGS. 4-7 by itself. This may be applicable in instances when the font size selection system initially uses larger differences between the font sizes of the text samples in FIGS. 4-7 as compared to the differences between the font sizes of the text samples shown in FIG. 8. For example, in embodiments where the test shown in FIG. 8 is provided in addition to the test shown in FIGS. 4-7, the range of font sizes used for the different text samples shown in FIG. 8 may be based on the font size of the sample text 406 in the test shown in FIGS. 4-7 for which the user last indicated he or she could read comfortably.

In particular, the selection of font sizes of the sample fonts displayed in the additional test shown in FIG. 8 may include font sizes that are between those font sizes of the sample text displayed to the user in FIGS. 4-7 and also includes font sizes that are slightly larger and smaller than the font size of the sample text 406 in FIGS. 4-7 for which the user last indicated he or she could read comfortably. In this manner, by using the larger differences in font size between text samples as shown in FIGS. 4-7 and then moving to use the smaller differences in font size for the text samples as shown in FIG. 8 once the initial font size selection is determined, the font size selection system may narrow in on the exact minimum font size that would be acceptable to the user more accurately and quickly than just providing the test as shown in FIGS. 4-7 and using the minimum difference in font size for each iteration.

For example, the text sample 406 was shown in FIGS. 4-7 in 28 pt., 24 pt., 20 pt., and then 16 pt., stepping down in font size by 4 pt. each time the user indicated he or she could still comfortably read the text sample. In the example provided, the font size of the sample text 406 for which the user last indicated he or she could read comfortably in the test provided in FIGS. 4-7 is 20 pt. as shown in FIG. 6. Based on this selected text sample having a 20 pt. font, the test then moves on to show a selection of text samples 804 on one page, as shown in FIG. 8, that are in 20 pt., 19 pt., 18 pt., 17 pt. and 16 pt., with a difference in font size of only 1 pt. between text samples instead of 4 pt. In the example shown in FIG. 8, the user then indicates to the font size selection system that the text sample with the smallest font size the user can read comfortably is the text sample with 18 pt. font (e.g., by clicking on or otherwise selecting that text sample as shown in FIG. 8). This 18 pt. font size will then be selected by the font size selection system as the font size to use throughout some or all user interfaces of one or more applications on the mobile device 102 and/or on other devices for that user instead of the initial 20 pt. as determined by the example test shown in FIGS. 4-7.

Figure 9:
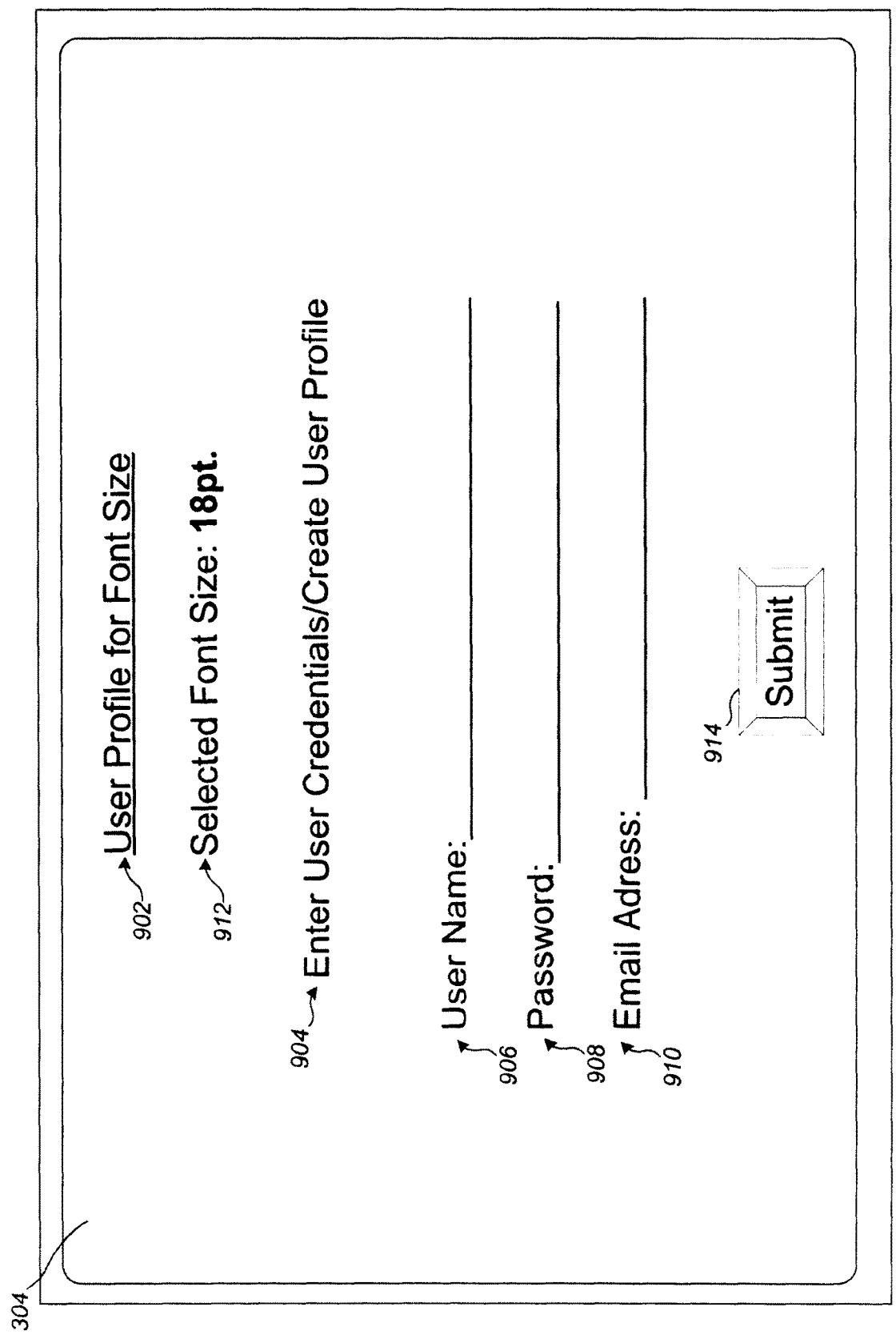
FIG. 9 is an image of the example display 304 of the mobile device 102 of FIGS. 1 and 3, showing an example user profile and an example user interface for either user authentication or to create a user profile for a new user of the font size selection system, according to various illustrated embodiments.

FIG. 9 is an image of the example display 304 of the mobile device 102 of FIGS. 1 and 3, showing an example user profile and an example user interface for either user authentication of a user of the font size selection system or to create a user profile for a new user of the font size selection system.

The font size selection system may provide support for multiple different users by saving the applicable font size selections in corresponding user profiles. Such a profile may be saved on server 112 as shown in FIG. 1 or another system that is remotely accessible via network 116 by various computing devices of the user having various different user interfaces and display types, such as mobile device 102, the television 104, the receiver EPG display system 110, the vehicle dashboard display system 106, the user computer 114 and the other device display system 108 shown in FIG. 1. In this manner, with the mobile device 102, the television 104, the receiver EPG display system 110, the vehicle dashboard display system 106, the user computer 114 and the other device display system 108 having remote access to the user's profile storing the selected font size(s), the user may complete the provided test one time on one of the devices (e.g., mobile device 102) and the system for font size selection will apply the corresponding fonts selected as a result of the test to all the various connected devices for the user without having to repeat the test on each device. The user interface shown in FIG. 9 is an example user interface for the user to be authenticated such that the font size selection system can access such a corresponding user profile and store and apply font settings accordingly for that user.

Also, the test and resulting font size selection based on the test results may also be modified by the font size selection system based on the corresponding application, devices, type of display, and/or application components of the television 104, the receiver EPG display system 110, the vehicle dashboard display system 106, the user computer 114, the other device display system 108 and selected user options and preferences, etc. In particular, such information regarding the applicable selected font size may be stored in the user profile and communicated from server 112 to the corresponding application, user interface, menu systems, APIs and/or application components of the television 104, the receiver EPG display system 110, the vehicle dashboard display system 106, the user computer 114 and the other device display system 108 to effect the corresponding font setting on the particular device and/or application(s) on the device.

In some embodiments, a default font type selection also may be applicable. For example, the user can see size 18 Arial font very well, but size 18 Calibri may be too small. Thus, the visual test may include comparison tests of different font types of the same size to determine also the default or suggested default font size and type for the user. Therefore, the user may be able to select a default font of the user's choosing that the user knows the user can see at a certain size. In some embodiments, this may occur within the application. Also, in some embodiments, a set of font type cross references is generated, stored in a database and/or otherwise accessible by the system. For example, a user sees font size Arial 18 pt. well. For the typical user, this corresponds to size 20 pt. Calibri. Therefore, using the font type cross reference database, if Calibri is the current font type in use by a particular application or system, the system will change the font size when Calibri is in use to 20 pt.

The example shown in FIG. 9 includes a user interface title 902, the selected font size to be stored in the user profile 912 (e.g., as a result of the test provided in FIGS. 4-8), and a user credential/authentication section 904 including a user name field 906 for the existing or new user name, a password field 908 for the existing or new password and an email address field 910 for the existing or new email address. A user selectable icon such as a "submit" button 914 may also be provided for the user to conveniently input all the entered information. Additional input fields and user selectable icons and controls may be provided for the user to include additional or different information. For example, this additional or different information may include, but is not limited to, current reading glasses prescription, age, user option selections and account settings.

In one embodiment, the example user profile and an example user interface shown in FIG. 9 may be presented by the font size selection system after the completion of the test shown in FIGS. 4-8 in order for the user to provide existing user credentials for the system to authenticate the user such that the font size selection system may access and update the selected font and other user selected options and preferences in the user's existing user profile. The example user profile and an example user interface shown in FIG. 9 may also be presented by the font size selection system after the completion of the test shown in FIGS. 4-8 in order for the user to provide new user credentials to generate a new user profile such that the font size selection system may access and store the selected font and other user options and preferences therein. Alternatively, the user credential/authentication section 904 may be presented to the user on the display 304 before a visual test such as that shown in FIGS. 4-8 is provided. The font size selection system may then store in the user profile the selected font resulting from the test and other selected user options and preferences after completion of the test shown in FIGS. 4-8.

Figure 10:
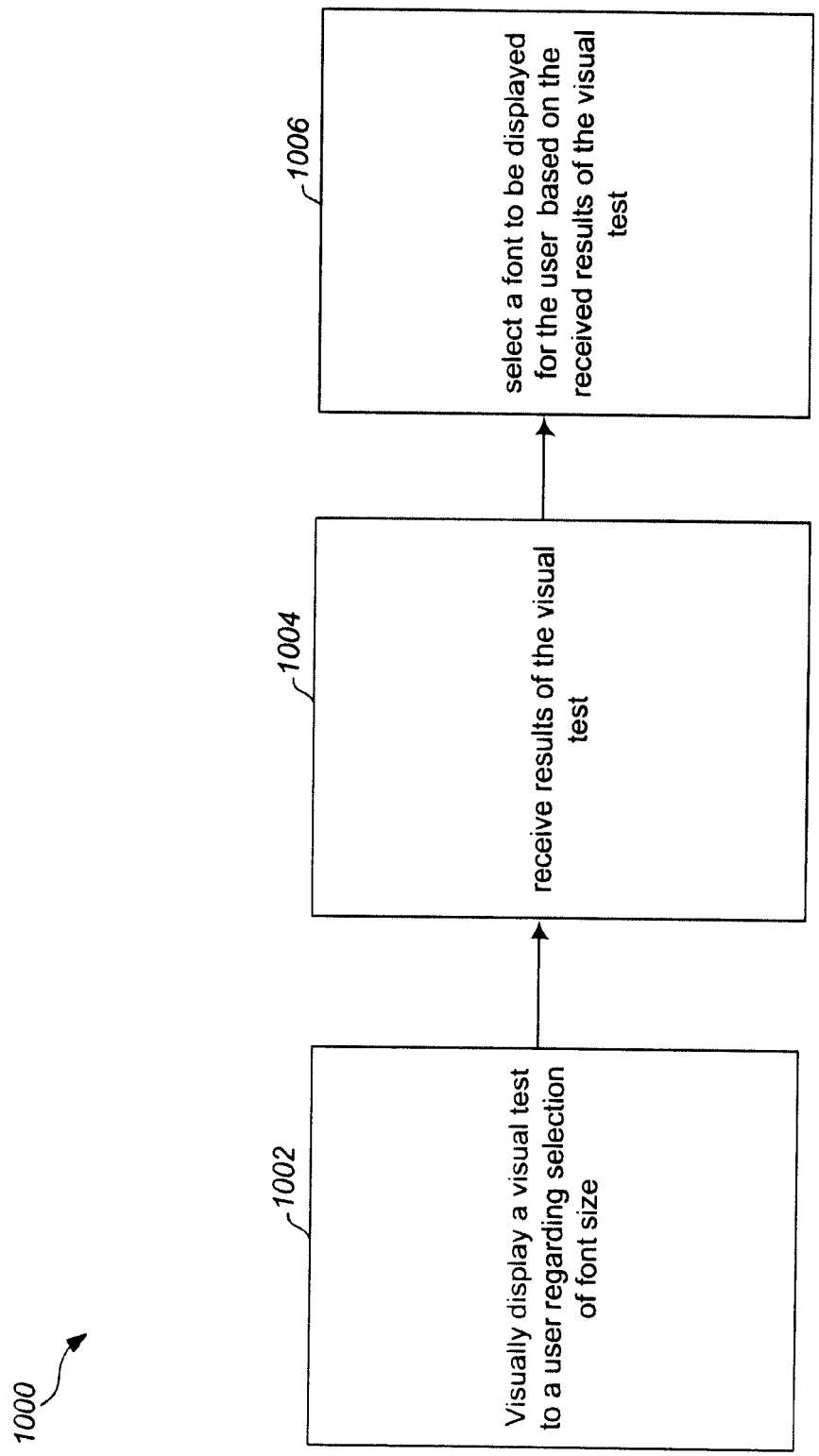
FIG. 10 is a flow diagram showing a method of font size selection, according to various illustrated embodiments.

FIG. 10 is a flow diagram showing a method 1000 of font size selection, according to various illustrated embodiments.

At 1002, the system for font size selection visually displays a visual test to a user regarding selection of font size.

At 1004, the system for font size selection receives results of the visual test.

At 1006, the system for font size selection selects a font to be displayed for the user based on the received results of the visual test.

Figure 11:
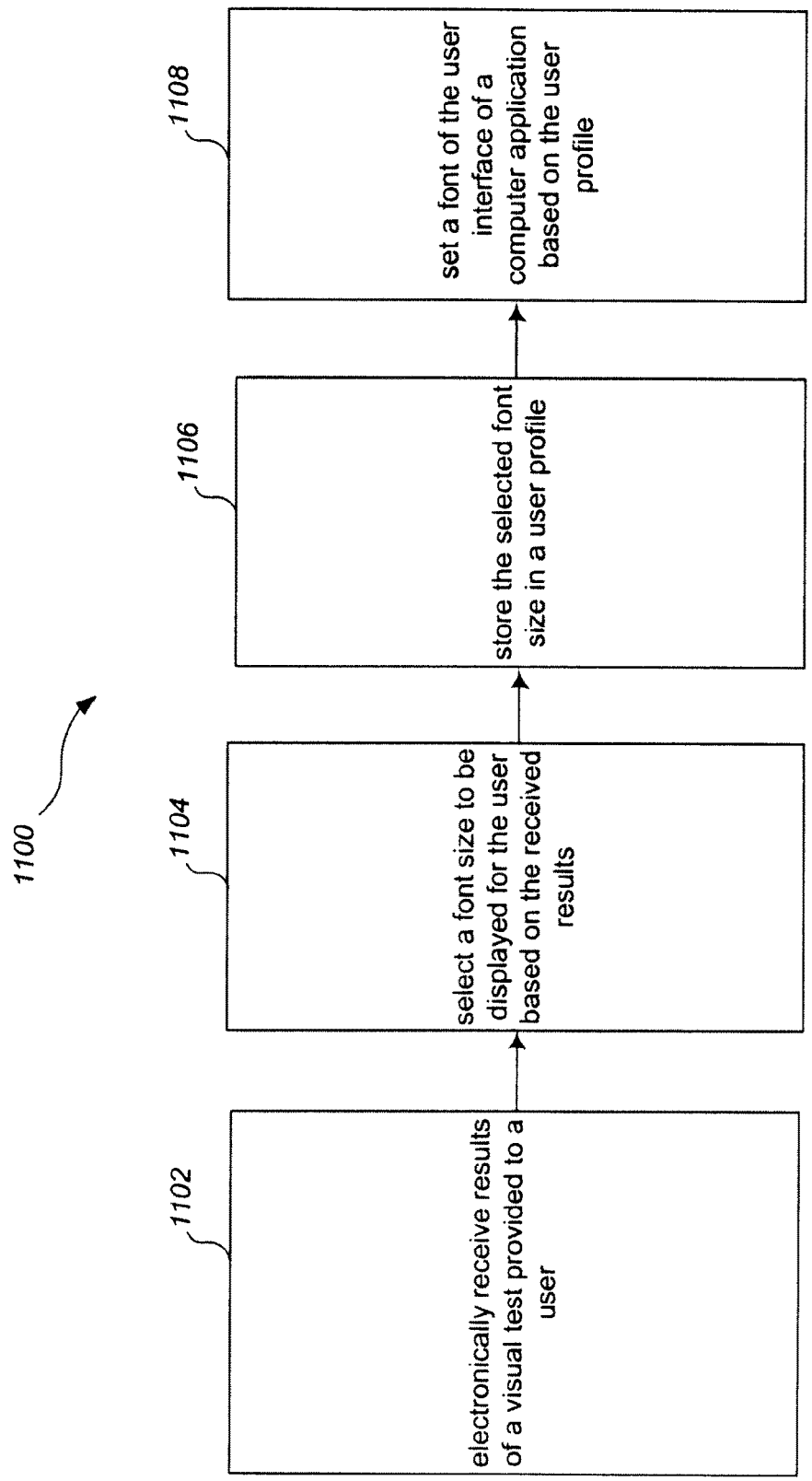
FIG. 11 is a flow diagram showing a method of font size selection including storing an association of the selected font size with a user profile of the user, according to various illustrated embodiments.

FIG. 11 is a flow diagram showing a method 1100 of font size selection including storing an association of the selected font size with a user profile of the user, according to various illustrated embodiments.

At 1102, the system for font size selection electronically receives results of a visual test provided to a user.

At 1104, the system for font size selection selects a font size to be displayed for the user based on the received results.

At 1106, the system for font size selection stores the selected font size in a user profile.

At 1108, the system for font size selection sets a font of the user interface of a computer application based on the user profile.

Figure 12:
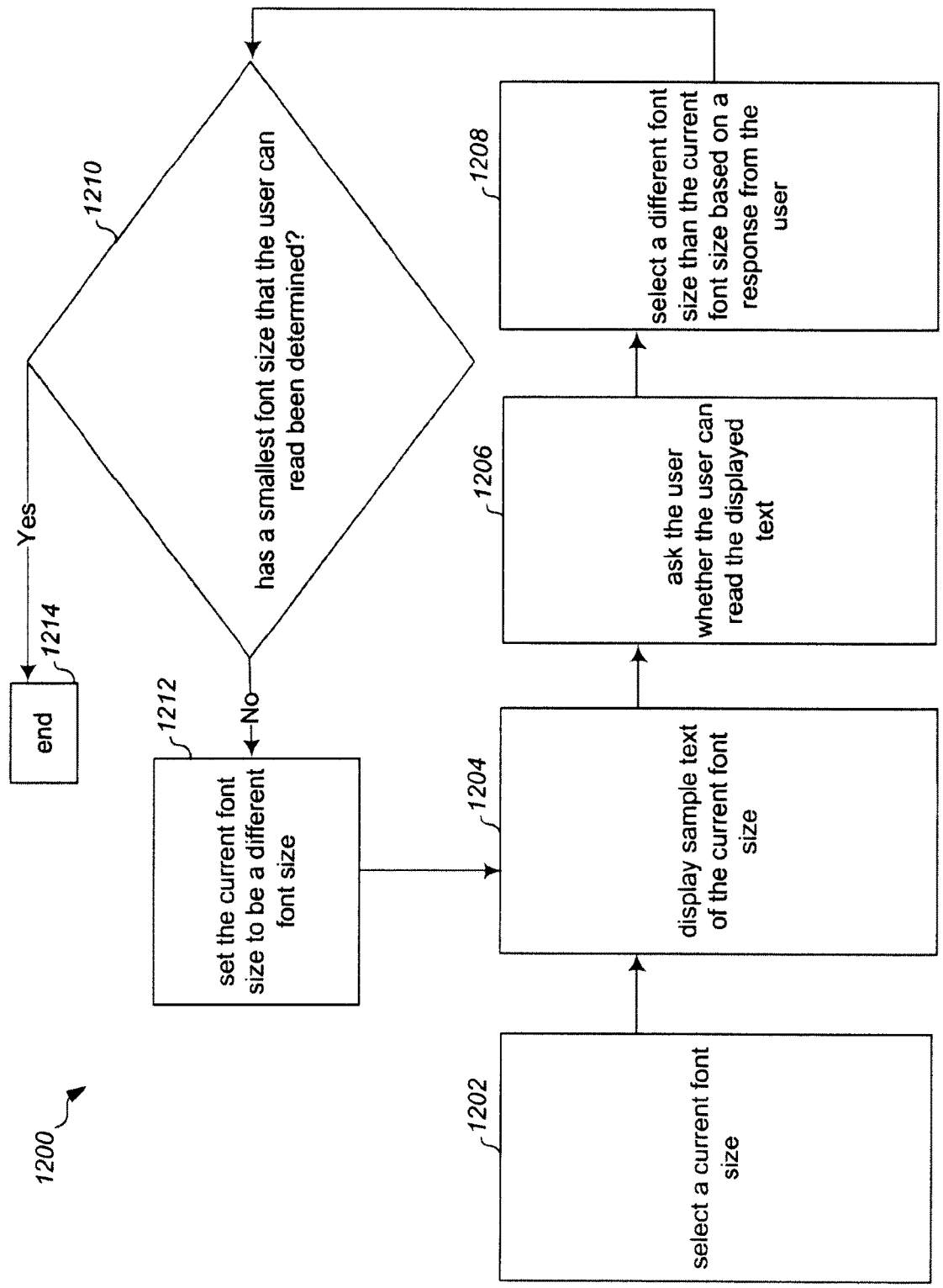
FIG. 12 is a flow diagram showing a method of the font size selection system providing a visual test to a user that is useful in the font size selection methods of FIGS. 10 and 11, according to various illustrated embodiments.

FIG. 12 is a flow diagram showing a method 1200 of the font size selection system providing a visual test to a user that is useful in the font size selection methods of FIGS. 10 and 11, according to various illustrated embodiments.

At 1202, the system for font size selection selects a current font size.

At 1204, the system for font size selection displays sample text of the current font size.

At 1206, the system for font size selection asks the user whether the user can read the displayed text.

At 1208, the system for font size selection selects a different font size than the current font size based on a response from the user.

At 1210, the system for font size selection makes a determination whether a smallest font size that the user can read has been determined.

At 1212, if a smallest font size that the user can read has not been determined, then the system for font size selection sets the current font size to be a different font size and the method 1200 proceeds to repeat starting at 1204.

At 1214, if a smallest font size that the user can read has been determined then the method 1200 stops.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art in light of this detailed description. The teachings provided herein of the various embodiments can be applied to other systems, not necessarily the exemplary communication vehicles generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or various combinations thereof. In one embodiment, the present subject matter may be implemented via Application Specific Integrated Circuits (ASICs) in light of this detailed description. However, those skilled in the art will recognize that the embodiments disclosed herein, in whole or in part, can be equivalently implemented in standard integrated circuits and/or as one or more computer programs running on one or more computers. This may include, but is not limited to: one or more programs running on one or more controllers, such as a microcontroller; one or more programs running on one or more processors, such as a microprocessor; firmware; or various combinations thereof. Designing the circuitry and/or writing the code for the software and or firmware would be well within the skill of one of ordinary skill in the art in light of this detailed description.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, flash drives, solid state drives, and computer memory; and other non-transitory computer-readable storage media.

The various embodiments described above can be combined to provide further embodiments in light of this disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a font size selection machine, the method comprising:
   visually displaying on the font size selection machine a visual test to a user regarding selection of font size to display for the user within a user interface of a computer application, the visual test including at least some visual components for electronic display to the user;
   electronically receiving, on the font size selection machine, results of the visual test;
   electronically selecting, on the font size selection machine, a font size to be displayed for the user within the user interface of the computer application based on the electronically receiving results of the visual test;
   electronically selecting a font to be displayed for the user within user interfaces for a plurality of different devices based on the electronically receiving the results of the visual test provided on the font size selection machine that is one of the plurality of devices, enabling the user to be able to complete the visual test one time on the font size selection machine that is one of the plurality of devices and corresponding fonts selected as a result of the visual test to be applied or communicated for the user to all devices of the plurality of devices, without the user having to repeat the visual test on each device of the plurality of devices; and
   before the visually displaying the visual test to the user regarding selection of font size, receiving, on the font size selection machine, an indication that the user is in a process of installing the computer application, and wherein the visually displaying the visual test to the user is performed by the font size selection machine at least in part in response to the receiving the indication that the user is installing the computer application.

2. The method of claim 1 further comprising:
   before visually displaying another time the visual test to the user regarding selection of font size, receiving, on the font size selection machine, an indication that the user is in a process of launching another computer application for a first time after an installation of the computer application, and wherein the visually displaying the visual test to the user is performed by the font size selection machine at least in part in response to the received indication that the user is in a process of launching the computer application for the first time after an the installation of the computer application.

3. The method of claim 2 wherein the process of launching the computer application for the first time is occurring on the font size selection machine.

4. The method of claim 1 wherein the font size selection machine is remote from a computer on which the computer application is installed.

5. The method of claim 1 wherein the visually displaying the visual test to the user regarding selection of font size to display for the user within the user interface of the computer application includes:
   displaying text of various different font sizes on the font size selection machine; and
   prompting the user regarding whether the user can read the text of various different font sizes on the font size selection machine.

6. The method of claim 5, wherein the font size selection machine electronically receiving results of the visual test includes:
   electronically receiving, on the font size selection machine, responses from the user to the prompting of the user regarding whether the user can read the text of various different font sizes.

7. The method of claim 6, wherein the electronically selecting a font to be displayed for the user within the user interface of the computer application based on the electronically receiving results of the visual test includes:
   selecting, on the font size selection machine, the font size to be displayed for the user within the user interface of the computer application corresponding to a font size of the various different font sizes that the user can read as indicated in the electronically received responses from the user to the prompting of the user regarding whether the user can read the text of various different font sizes.

8. The method of claim 1 wherein the visually displaying the visual test to the user regarding selection of font size to display for the user within the user interface of the computer application includes:
   selecting a font size of a group of font sizes as a currently selected font size on the font size selection machine;
   displaying sample text of the currently selected font size on the font size selection machine;
   prompting the user regarding whether the user can read the displayed sample text of the currently selected font size on the font size selection machine;
   selecting a different font size than the currently selected font size based on a response from the user received in response to the prompting the user regarding whether the user can read the displayed sample text of the currently selected font size on the font size selection machine; and starting with the selected different font size as the currently selected font size, repeating, on the font size selection machine, the displaying sample text of the currently selected font size, the prompting the user regarding whether the user can read the displayed sample text of the currently selected font size and the selecting a different font size than the currently selected font size based on a response from the user received in response to the prompting, until a smallest font size of the group of font sizes that the user can read is determined based on the responses from the user received in response to the prompting.

9. The method of claim 8 wherein the electronically selecting a font to be displayed for the user within the user interface of the computer application based on the electronically receiving results of the visual test includes:

selecting the smallest font size of the group of font sizes that the user can read determined based on the responses from the user received in response to the prompting as the font size to be displayed for the user within the user interface of the computer application.

10. The method of claim 8 wherein the prompting the user regarding whether the user can read the displayed sample text of the currently selected font size includes prompting the user whether the user can one or more of: comfortably, easily, and accurately, read the displayed sample text of the currently selected font size.

11. The method of claim 8 wherein the visually displaying the visual test to the user regarding selection of font size to display for the user within the user interface of the computer application further comprises:

based on the determined smallest font size of the group of font sizes that the user can read, displaying sample text including sample text of different font sizes than any of the font sizes of the previously displayed sample text; and prompting, on the font size selection machine, the user to select text of a smallest font size that the user would accept from the displayed sample text that includes sample text of different font sizes than any of the font sizes of the previously displayed sample text.

12. The method of claim 1 wherein the visually displaying the visual test to the user regarding selection of font size to display for the user within the user interface of the computer application includes:

displaying sample text of different font sizes to the user on the font size selection machine; and prompting the user to select text of a smallest font size that the user would accept from the displayed sample text on the font size selection machine.

13. The method of claim 1 wherein the electronically selecting a font to be displayed for the user within user interfaces for a plurality of different devices based on the electronically receiving the results of the visual test provided on the font size selection machine that is one of the plurality of devices comprises:

electronically storing an association of the selected font to be displayed for the user with a user profile of the user, the user profile being remotely accessible by the plurality of different devices over a communications network;

electronically providing access to the profile over the communications network to a first different device of the plurality of different devices; and in response to the providing access to the profile over the communications network to the first different device of the plurality of different devices, applying the font size to be displayed for the user within a user interface of the first different device of the plurality of different devices as a result of the visual test displayed on the font size selection machine, the font size selection machine being a different device than the first different device of the plurality of different devices.

14. The method of claim 13 wherein the plurality of different devices whose user interfaces on which the font is electronically selected to be displayed includes at least one of: a television, a receiving device electronic program guide (EPG) display system and a vehicle dashboard display system.

15. The method of claim 1 wherein each of the plurality of devices is associated with the user and the electronically selecting a font to be displayed for the user within user interfaces for a plurality of different devices based on the electronically receiving the results of the visual test provided on the font size selection machine comprises applying the selected font size as a result of the visual test remotely to all the plurality of devices for the user without the user having to repeat the test on each of the plurality of devices.

16. A non-transitory computer-readable storage medium having computer-executable instructions stored thereon that, when executed by a computer system, cause the computer system to perform a process that includes:

receiving an indication that a user is in a process of installing a computer application; and visually displaying a visual test to the user regarding selection of font size at least in part in response to the receiving the indication that the user is installing the computer application;

electronically receiving results of the visual test, wherein the visual test is electronically provided to the user and is regarding selection of font size to display for the user within a user interface of the computer application, the visual test including at least some visual components for electronic display to the user;

electronically selecting a font to be displayed for the user within the user interface of the computer application based on the electronically received results of the visual test;

electronically storing an association of the selected font to be displayed for the user with a user profile of the user; and electronically authenticating the user and setting a font of the user interface of the computer application as the selected font to be displayed for the user based on the authentication of the user and stored association of the selected font to be displayed for the user with the user profile of the user; and electronically selecting a font to be displayed for the user within user interfaces for a plurality of different devices based on electronically received results in response to the visual test provided on one device that comprises prompting of the user on one device of the plurality of devices, enabling the user to be able to complete the visual test one time on the one device and corresponding fonts selected as a result of the visual test to be applied or communicated for the user to all devices of the plurality of devices, without the user having to repeat the visual test on each device of the plurality of devices.

17. The non-transitory computer-readable storage medium of claim 16, wherein the process further comprises:

receiving an indication that the user is in a process of launching the computer application for the first time after an installation of the computer application; and visually displaying the visual test to the user regarding selection of font size another time at least in part in response to the receiving the indication that the user is in a process of launching another computer application for the first time after an installation of the computer application.

18. The non-transitory computer-readable storage medium of claim 16 wherein the visually displaying the visual test to the user regarding selection of font size to display for the user within the user interface of the computer application includes:

displaying text of various different font sizes; and prompting the user regarding whether the user can read the text of various different font sizes.

19. The non-transitory computer-readable storage medium of claim 16, wherein the electronically receiving results of the visual test includes:

electronically receiving responses from the user to the prompting of the user regarding whether the user can read the text of various different font sizes.

20. A system for font size selection comprising:

at least one computer processor; and at least one memory coupled to the at least one processor, the at least one memory having computer-executable instructions stored thereon that, when executed by the at least one processor, cause the at least one processor to:

receive an indication that a user is in a process of installing a computer application; and visually display a visual test to the user regarding selection of font size at least in part in response to the receiving the indication that the user is installing the computer application and, as part of the visual test:

select a font size of a group of font sizes as a currently selected font size;

display sample text of the currently selected font size;

provide prompts to a user regarding whether the user can read the displayed sample text of the currently selected font size;

select a different font size than the currently selected font size based on a response from the user received in response to the prompts to the user regarding whether the user can read the displayed sample text of the currently selected font size; and starting with the selected different font size as the currently selected font size, repeat the display of sample text of the currently selected font size, the prompts to the user regarding whether the user can read the displayed sample text of the currently selected font size, and the selection of a different font size than the currently selected font size based on a response from the user received in response to the prompts, until a smallest font size of the group of font sizes that the user can read is determined based on the responses from the user received in response to the prompting; and electronically select a font to be displayed for the user within a user interfaces for a plurality of different devices based on electronically received results in response to the visual test provided on one device that comprises the prompting of the user on one device of the plurality of devices, enabling the user to be able to complete the visual test one time on the one device and corresponding fonts selected as a result of the visual test to be applied or communicated for the user to all devices of the plurality of devices, without the user having to repeat the visual test on each device of the plurality of devices.

21. The system of claim 20 wherein the prompts to the user regarding whether the user can read the displayed sample text of the currently selected font size includes prompts the user soliciting a response indicative of whether text of the currently selected font size would be acceptable to the user for reading.

22. The system of claim 20 wherein the computer-executable instructions, when executed by the at least one processor, further cause the at least one processor to:

display sample text of different font sizes to the user in proximity to each other on a same user interface page for visual comparison by the user; and prompt the user to select text of a smallest font size that the user would accept from the sample text of different font sizes displayed in proximity to each other for visual comparison by the user.

* * * * *